United States Patent [19]

Weber, Jr. et al.

[11] Patent Number: 4,770,472
[45] Date of Patent: Sep. 13, 1988

[54] FREIGHT BRAKE CONTROL VALVE HAVING AN EMERGENCY PISTON SLIDE VALVE ARRANGED TO PROVIDE AN ACCELERATED BRAKE APPLICATION FUNCTION

[75] Inventors: Charles L. Weber, Jr., North Huntingdon; James E. Hart, Trafford, both of Pa.

[73] Assignee: American Standard Inc., Wilmerding, Pa.

[21] Appl. No.: 27,591

[22] Filed: Mar. 18, 1987

[51] Int. Cl.$^4$ .................. B60T 11/34; B60T 17/04
[52] U.S. Cl. ........................................ 303/33; 303/82
[58] Field of Search ............... 303/7, 8, 9, 33, 35, 303/36, 37, 38, 39, 81, 82, 83

[56] References Cited

U.S. PATENT DOCUMENTS

| | | | |
|---|---|---|---|
| 1,916,299 | 7/1933 | Campbell | 303/39 |
| 1,947,696 | 2/1934 | Chevillot | 303/83 X |
| 2,027,468 | 1/1936 | Campbell | 303/35 |

*Primary Examiner*—Andres Kashnikow
*Assistant Examiner*—Timothy Newholm
*Attorney, Agent, or Firm*—G. J. Falce

[57] ABSTRACT

A freight brake control valve device in which the emergency piston slide valve is arranged to incorporate, in conjunction with the conventional service stability function provided thereby, an accelerated service application function in which a continuous local venting of brake pipe pressure is provided to hasten propagation of service rates of brake pipe reduction. A preliminary flow restrictor in one flow path and a primary flow restrictor in a parallel flow path control the quick-action chamber "breathing" rate such that the emergency piston is stabilized against movement to emergency position, as long as the brake pipe pressure reduction does not exceed a service rate. Following a service application, the preliminary flow restrictor has the further function of maintaining "breathing" until after the local reduction of brake pipe pressure is cut off, thereby assuring positive movement of the emergency piston to its service lap position.

21 Claims, 3 Drawing Sheets

FREIGHT BRAKE CONTROL VALVE HAVING AN EMERGENCY PISTON SLIDE VALVE ARRANGED TO PROVIDE AN ACCELERATED BRAKE APPLICATION FUNCTION

BACKGROUND OF THE INVENTION

The present standard, A.A.R. approved, ABDW Freight Brake Control Valve manufactured by Westinghouse Air Brake Company includes an accelerated application valve portion that is mounted on the valve emergency portion and operates in response to the quick-action chamber "breathing" pressure developed by the emergency piston during service brake applications. Quick-action chamber "breathing" is necessary during service brake applications in order to stabilize the emergency piston against undesired emergency operation. The exhaust backpressure of this quick-action chamber "breathing" pressure is utilized to pilot the accelerated application valve which, in turn, operates to effect a local, quick service reduction of brake pipe pressure in a cyclic manner during service brake applications to supplement the trainline reduction of brake pipe pressure at each car of the train, thereby hastening propagation of the brake pipe signal through each car of a train.

It will be appreciated, therefore, that during a service brake pipe reduction, operation of the accelerated application valve is predicated on movement of the emergency piston to a position in which the quick-action chamber pressure on one side of the piston is vented to atmosphere, and thus reduced at a rate corresponding to the existing service rate of reduction of the brake pipe pressure effective on the other side of the piston, thereby preventing the emergency piston from being moved further to an emergency application position.

It will be further appreciated that this emergency piston includes a slide valve via which the quick-action chamber pressure venting or "breathing" connection is established. In addition to providing the quick-action chamber "breathing" function, the emergency piston slide valve also provides for piloting the vent valve to obtain quick-action emergency. It is well known that slide valve construction, while having a long maintenance-free service life, is somewhat more expensive than other valve-type constructions. However, multiple valve control functions can be incorporated in a relatively small valve device to offset the initial expense of construction.

In U.S. Pat. No. 4,690,443, there is disclosed an arrangement for incorporating the accelerated application valve function in the emergency piston slide valve. It will be appreciated, however, that one characteristic of slide valve operation is that the first function to occur in one direction of movement is the last function to occur during movement in the opposite direction. Therefore, in order that the accelerated application venting of brake pipe pressure be terminated prior to terminating the venting of quick-action chamber pressure to assure that the accelerated application is not perpetuated, the accelerated application venting of brake pipe pressure is initiated after the venting of quick-action chamber pressure. Accordingly, the accelerated application function is not positive in its operation, since relatively light brake pipe pressure reductions may be counteracted by the venting of quick-action chamber pressure before the emergency piston has moved sufficiently to effect the accelerated application function.

Another emergency piston slide valve arrangement is disclosed in U.S. Pat. No. 4,744,609 in which two slide valves are employed to provide positive cut-off of the accelerated application function during a service lap condition, without sacrificing positive actuation of the emergency piston to accelerated application position during brake application.

SUMMARY OF THE INVENTION

It is, therefore, an object of the present invention to incorporate the accelerated application function in the emergency piston slide valve such that provision of the accelerated application function is assured even during light service brake applications, while also assuring positive cut-off of the accelerated application function during a subsequent lap of the service brake application, to thereby prevent the accelerated application reduction of brake pipe pressure from perpetuating itself.

It is another object of the invention to cut off the accelerated application function of the emergency piston when a brake pipe reduction approaches an emergency rate, so that the accelerated application reduction of brake pipe pressure does not influence the sensing of an emergency brake application by the emergency piston.

Another object of the present invention is to incorporate control of the quick-action chamber charging function in the emergency piston slide valve.

Briefly, these objectives are accomplished by modifying the emergency piston slide valve of a conventional ABD type freight brake control valve device to provide sequential venting of quick-action chamber pressure effective on one side of the emergency piston during initial movement of the emergency piston toward service application position in response to a trainline brake pipe reduction. During initial movement of the emergency piston, quick-action chamber pressure is vented at a relatively slow rate and following establishment of the accelerated application reduction of brake pipe pressure at the emergency piston slide valve, a subsequent higher rate of venting of quick-action chamber pressure is established. This provides a "preliminary" and "primary" venting of quick-action chamber pressure which, combined, provides the conventional "breathing" action by which means the emergency piston is stabilized against undesired emergency application of the brakes so long as the effective brake pipe reduction does nit exceed a service rate. In accordance with the present invention, the "preliminary" vent connection of quick-action chamber pressure at the emergency piston slide valve remains in effect until after the accelerated application venting of brake pipe pressure is cut off during return movement of the emergency piston from service application position toward release position, thereby assuring development of a pressure differential across the emergency piston to assure its positive movement to release position. In this manner, the accelerated application reduction of brake pipe pressure is positively terminated, so as not to perpetuate itself. Moreover, this light initial "preliminary" venting of quick-action chamber pressure during movement of the emergency piston toward service application position has little effect in counteracting relatively low rates of reductions of trainline brake pipe pressure, thus preserving the positive action and thus the efficiency of the accelerated application function.

In addition, the emergency piston slide valve is arranged to cut off the accelerated application reduction of brake pipe pressure upon movement of the emergency piston toward emergency application position in response to a reduction of trainline brake pipe pressure approaching an emergency rate. In this manner, the brake pipe/quick-action chamber pressure differential across the emergency piston is due solely to the trainline brake pipe pressure reduction. In this sense, the emergency piston is conditioned to sense an emergency rate of brake pipe reduction without any influence resulting from the accelerated application function.

By incorporating this accelerated application function in the already existing emergency piston slide valve, the separate accelerated application valve portion presently employed on ABDW type freight brake control valves can be eliminated and its function carried out by the emergency piston. Accordingly, a weight savings can be realized, as well as an attendant cost savings.

BRIEF EXPLANATION OF THE DRAWINGS

These and other objects and attendant advantages will become apparent from the following more detailed explanation when taken in accordance with the accompanying drawings, in which.

DESCRIPTION AND OPERATION

Figure 1:
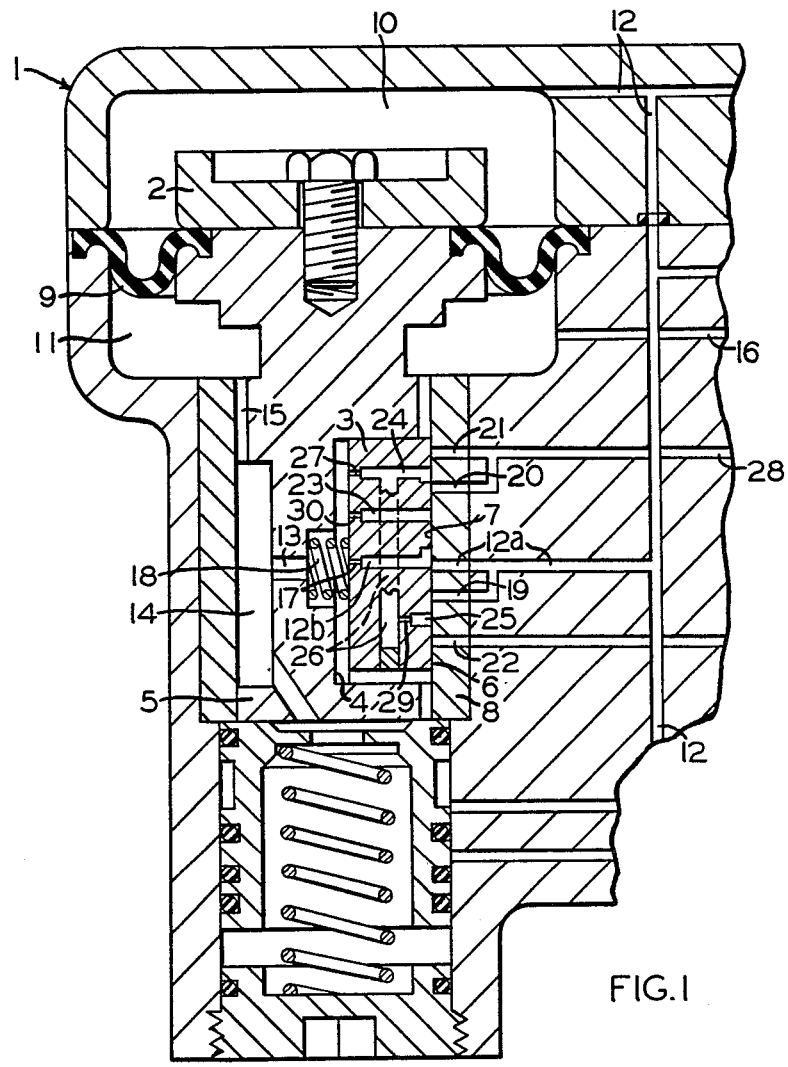
FIG. 1 is a diagrammatic view showing the emergency piston of a conventional ABD type freight brake control valve device in its release and charging position, and the emergency piston slide valve and seat modified to incorporate the accelerated service application function of the present invention.

Referring to FIG. 1 of the drawings, there is shown incorporated in the emergency portion 1 of a conventional freight brake control valve device, such as the ABD Control Valve manufactured by the Westinghouse Air Brake Company, an emergency piston 2 having a slide valve 3 carried in a recess 4 of the emergency piston stem 5 so as to move axially with the emergency piston. Slide valve 3 is formed with a planar face 6 which engages a conforming face 7 of a slide valve bushing 8 in which the stem 5 of emergency piston 2 is guidably supported. A diaphragm 9 of piston 2 cooperates with the body of emergency portion 1 to form a chamber 10 on one side and a chamber 11 on the opposite side.

Compressed air carried in the trainline brake pipe (not shown) is connected to chamber 10 via a brake pipe branch passage 12; and concurrently to the conventional ABD valve quick-action chamber (not shown) via a brake pipe branch passage 12a, a passage 12b in slide valve 3, a recess 4, a passage 13 between recess 4 and a cavity 14 within bushing 8, a passage 15 between cavity 14 and chamber 11, and a passage 16 leading from chamber 11. An opening in passage 12b corresponding to a drill size of approximately 0.020 inch provides a flow restrictor 17, so that during charging, the pressure in chamber 10 builds up faster than in chamber 11 to establish a downward-acting pressure differential across piston diaphragm 9 to maintain the piston in its release and charging position, as shown in FIG. 1, until such time as a brake pipe reduction is initiated. In addition, the size of this restrictor 17 serves to prevent the pressure in chamber 11 from decreasing at a rate greater than the maximum allowable leakage rate of brake pipe pressure, e.g., 7 psi. per min. The purpose of this is to stabilize piston 2 against actuation in response to normal brake pipe leakage, so that operation will result only in response to a selected reduction of the brake pipe pressure.

A spring 18 between the slide valve 3 and the recess 4 of piston stem 5 urges the slide valve face 6 into engagement with the adjoining face 7 of bushing 8 with sufficient force that the lapped interface therebetween provides a pressure seal between the passageways that open at the respective slide valve and bushing faces. In addition to passage 12a, bushing 8 contains passages 19, 20, 21, and 22, each of which has one end opening at the bushing face 7. The other end of passage 19 is connected to passage 12a; the other end of passage 20 is connected to passage 21; the other end of passage 21 is connected to atmosphere; and the other end of passage 22 is connected to auxiliary devices (not shown). Slide valve 3 contains, in addition to passage 12b, passages 23 and 24, each of which opens at one end into recess 4 and at the other end at slide valve face 6. Another slide valve passage 25 has one end open at the slide valve face 6 and the other end connected to a passage 26 that is, in turn, connected to passage 24. The porting in the faces of slide valve 3 and bushing 8 is arranged so that in the release and charging position of FIG. 1, only passages 12a and 12b are connected to establish the aforementioned charging flow path. The remaining passages are all cut off at the slide valve/bushing interface.

Figure 2:
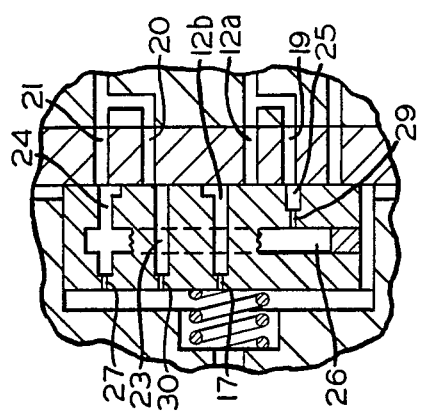
FIGS. 2-7 are enlarged, fragmentary views of the emergency piston slide valve and seat showing the port connections in different positions of the emergency piston.

When the compressed air in the trainline brake pipe is exhausted at a rate in excess of the rate set by charging restrictor 17, pressure in chamber 11 is reduced with the brake pipe pressure, but at a slower rate. Conversely, pressure in chamber 10 is reduced with brake pipe pressure unrestricted via passage 12, thereby creating a pressure differential across piston 2 sufficient to force the emergency piston in an upward direction from release position toward emergency application position. The initial function accomplished by this movement of piston 2 is that of disconnecting the charging flow path provided by passages 12a and 12b at the slide valve/bushing interface to terminate charging of chamber 11 and the quick-action chamber volume. This condition is shown in FIG. 2, where it can be seen that all of the passage connections remain cut-off at the slide valve/bushing interface. It will be seen from the graph of FIG. 8 that the ports of passages 12a and 12b remain open during this initial upward movement of piston 2 until at point l, the ports begin to close. Port closure progresses with continued piston movement until at point m, full closure occurs and charging cut-off is complete.

Figure 3:
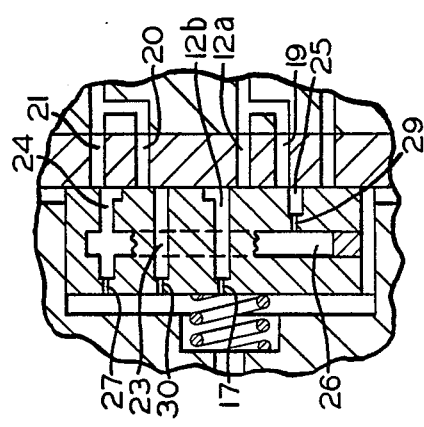

As the brake pipe pressure reduction continues, upward piston movement toward application position will continue, with slide valve 3 placing passage 24 in communication with passage 21 to establish a first flow path via which a preliminary exhaust or "breathing" of quick-action volume pressure effective in chamber 11 is established for a purpose hereinafter discussed. This exhaust of the compressed air from chamber 11 takes place via passage 15, cavity 14, passage 13, recess 4, a preliminary flow restrictor 27 in the form of an approximate 0.0087 inch drilled opening in passage 24, passage 21, and an exhaust passage 28, as shown in FIG. 3.

Figure 4:
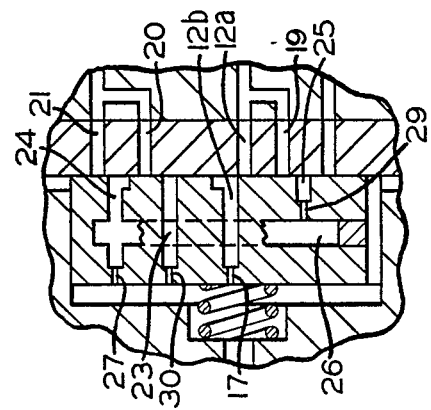
Figure 8:
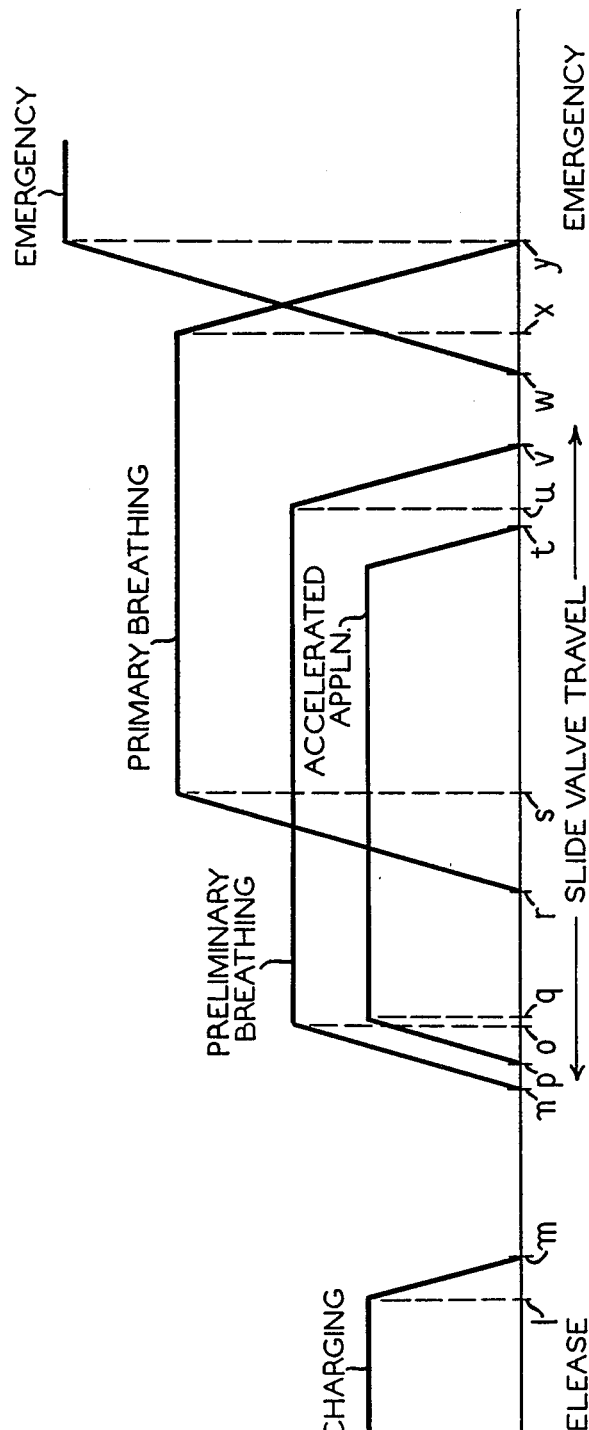
FIG. 8 is a graph in which the various port connections of FIGS. 1-7 and the point at which these port connections begin to open or become fully closed are represented through the full range of slide valve travel between brake release and emergency application positions.

The graph of FIG. 8 shows that when the slide valve 3 has moved to a position corresponding to point n, passages 24 and 21 just begin to open at the slide valve/bushing interface and are fully open when the slide valve reaches a position corresponding to point o. Shortly after beginning to open, the flow capacity of these passages exceeds the flow capacity of restrictor 27. Accordingly, flow restrictor 27 becomes effective to set the minimum rate at which the trainline brake pipe pressure must continue to reduce, in order to maintain a sufficient pressure differential across piston 2 to sustain its movement toward application position. Assuming this is the case, slide valve 3 will establish flow communication between passages 25 and 19, as indicated at point p in the graph of FIG. 8, it being noted that full opening of passages 25 and 19 occurs in substantially the same position of slide valve 3 as passages 24 and 21 achieve full opening. Accordingly, a second flow path is established as indicated diagrammatically in FIG. 4, to provide an accelerated application function in which brake pipe pressure is vented locally at the control valve emergency valve portion 1 from the trainline brake pipe via passages 12, 12a, 19, 25, a flow restrictor 29 in the form of an approximate 0.016 inch drilled opening in passage 25, passage 26, the preliminary "breathing" passages 24 and 21, and exhaust passage 28. It will be appreciated, therefore, that this local venting of brake pipe pressure thus occurs at each car in a train in conjunction with the trainline reduction of brake pipe pressure, the purpose being to hasten propagation of the trainline brake pipe reduction through the train in order to achieve faster brake response.

Figure 5:
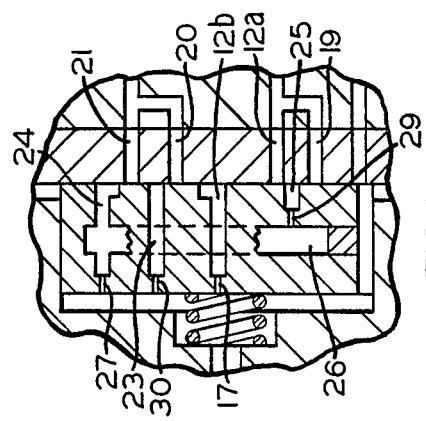

The aforementioned local venting of brake pipe pressure has the further effect of increasing the upwardacting pressure differential across piston 2, thereby assuring its movement to a primary "breathing" position, as shown in FIG. 5. In this position, quick-action volume pressure effective in chamber 11 is vented via a third flow path including passages 23 and 20, which are communicated at the slide valve/bushing interface. Passage 23 in this third flow path is formed with an approximate 0.081 inch drilled opening to provide a final flow restrictor 30. The chart of FIG. 8 shows that this communication between passages 23 and 20 constituting the primary "breathing" function begins to open when piston 2 has advanced slide valve 3 to a position represented by point r, and shows that this communication is fully open when the slide valve advances to the position represented by point s.

Slide valve travel beyond point s produces maximum "breathing", i.e. the highest rate at which quick-action volume pressure effective in chamber 11 can be exhausted via the preliminary and primary flow restrictors, in order to establish service stability of the emergency piston during service brake applications. This service stability results from the fact that the maximum "breathing" of quick-action volume pressure counteracts the maximum service rate of brake pipe reduction effective in chamber 10, due to the combined trainline and local accelerated application reduction of brake pipe pressure, thereby creating a balanced pressure differential across piston 2. Lesser rates of brake pipe pressure reductions will unbalance the emergency piston 2 and force it back toward release position until it finds a position in the slide valve range between points r and s, where the restriction offered by the effective port area of passages 20 and 23, at the slide valve/bushing interface, becomes sufficiently less than the restriction offered by the primary restrictor 30, to reestablish a pressure balance across piston 2.

When the trainline brake pipe reduction is terminated, quick-action volume pressure continues to be exhausted via the preliminary and primary flow restrictors 27 and 30 in the first and third flow paths. This results in a pressure differential being developed across piston 2 in a direction to urge the piston toward release position. It will now be appreciated that in providing a first flow path via which quick-action volume pressure in chamber 11 is vented prior to establishing the accelerated application, venting of brake pipe pressure via the second flow path during movement of piston 2 toward application position, the first flow path will remain open until after the second flow path is interrupted during movement of piston 2 back toward release position.

Although the size of the drill port comprising preliminary restrictor 27 is smaller than the size of the drill port comprising accelerated application restrictor 29, the fact that the volume of quick-action volume pressure is considerably less than the volume of brake pipe pressure causes the pressure reduction at chamber 11 to occur at a faster rate than the reduction of pressure in chamber 10. This, combined with the fact that the exhaust of quick-action volume pressure in chamber 11 is not terminated until after termination of the exhaust of brake pipe pressure from chamber 10, assures a complete and positive movement of piston 2 to a service lap position, as shown in FIG. 2, in which the accelerated application reduction of brake pipe pressure is positively terminated. The position of slide valve 3 during this service lap is represented in the graph of FIG. 8 as lying between points m and n.

A subsequent increase of brake pipe pressure to release the brake application in effect will result in a pressure increase at chamber 10, it being understood that the quick-action volume charging communication via passages 12a and 12b is cut off in service lap position of emergency piston 2, so that the pressure in chamber 11 remains constant. Thus, a downward-acting pressure differential is established across piston 2 to force the piston from service lap position to the release and charging position shown in FIG. 1.

If, at any time, a reduction of brake pipe pressure occurs at a rate in excess of the maximum service rate, flow restrictors 27 and 30 will prevent the quick-action volume pressure effective in chamber 10 from "breathing" with the brake pipe pressure reduction. Accordingly, a pressure differential will arise between chambers 10 and 11 to force emergency piston 2 towards emergency position to the position shown in FIG. 6. In this position, maximum "breathing" of quick-action volume pressure continues via flow restrictors 27 and 30, but the local exhaust of brake pipe pressure is cut off at the slide valve/bushing interface, thereby terminating the accelerated application function. This cut-off position terminating the accelerated application function ensures that no local exhaust of brake pipe pressure occurs to influence the rate of brake pipe pressure reduction to which piston 2 is responsive, thereby preserving the normal service stability characteristic of the emergency piston.

Figure 6:
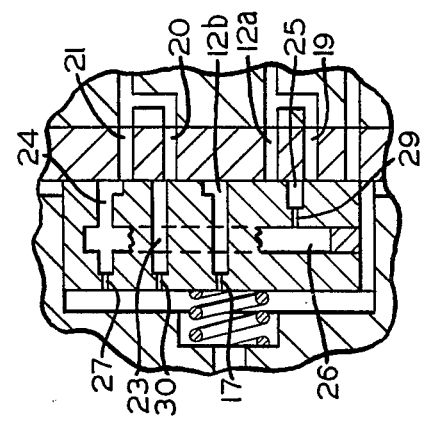
Figure 7:
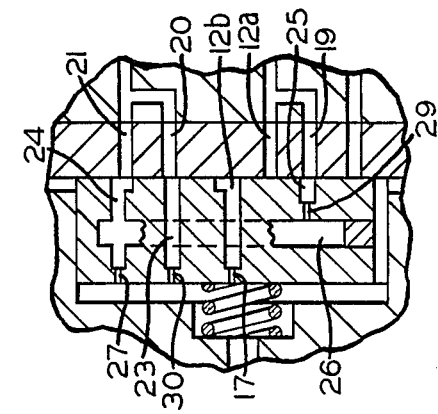

As shown in FIG. 6 and represented at point t in the chart of FIG. 8, the accelerated application exhaust of brake pipe pressure via the second flow path is terminated by reason of slide valve passage 25 being moved out of communication with passage 19 in the slide valve bushing 8. Concurrently, slide valve passages 23 and 24 remain in such full communication with their respective passages 20 and 21 in bushing 8 that quick-action volume pressure effective in chamber 11 continues to "breath" at the maximum service rate set by flow restrictors 27 and 30. If the rate of reduction of brake pipe pressure is such that the continuing maximum "breathing" rate of quick-action volume pressure is insufficient to counteract the pressure differential in chambers 10 and 11 acting on piston 2, the piston will be forced to its emergency position as shown in FIG. 7.

As slide valve 3 moves past point t with movement of piston 2 toward emergency position, passage 24 will begin to move out of communication with passage 21 at point u and will be moved completely out of communication at point v to terminate "breathing" of quick-action volume pressure via the first flow path, after which the end of slide valve 3 will begin to uncover passage 22 in bushing 8 at point w and fully uncover this passage at point y. Opening of passage 22 establishes a fourth flow path via which quick-action volume pressure is connected from cavity 14 and slide valve recess 4 to auxiliary valve devices (not shown) that are commonly employed to initiate or perpetuate an emergency brake application.

During movement of slide valve 3 between points w and y, slide valve passage 23 begins to move out of communication with passage 20 in bushing 8 at point x and is moved completely out of communication at point y to terminate "breathing" of quick-action volume pressure via the third flow path. This leaves the final blow-down of quick-action volume pressure to occur via passage 22 at a controlled rate, which prevents emergency piston 2 from resetting to release position for a predetermined duration of time sufficient to bring the train to a halt in response to the emergency application, by holding a brake pipe vent valve open.

We claim:

1. In a railway train having a fluid-pressure-charged brake pipe, a control valve device operable in response to a selective reduction of said brake pipe fluid pressure at an emergency rate to provide an emergency brake application comprising:
   (a) a housing having a cavity;
   (b) a piston member in said cavity forming therewith first and second pressure chambers on opposite sides thereof having fluid pressure communication with said brake pipe;
   (c) a first flow path having a first flow restriction via which fluid under pressure is vented to the atmosphere from said second chamber;
   (d) a second flow path via which fluid under pressure is vented to the atmosphere from said brake pipe to provide a local reduction of said brake pipe fluid pressure in addition to said selective reduction;
   (e) a third flow path having a second flow restriction via which fluid under pressure is vented to the atmosphere from said second chamber; and
   (f) valve means carried by said piston member for establishing said first and third flow paths when said piston member is actuated in one direction in response to a pressure differential thereacross due to a reduction of said brake pipe fluid pressure effective in said first chamber until said second chamber fluid pressure is reduced sufficiently to counterbalance said pressure differential, thereby preventing said piston member from being actuated in said one direction sufficiently to effect said emergency brake application so long as said reduction of said brake pipe fluid pressure occurs at a service rate that is less than said emergency rate, said valve means being further operative for establishing said second flow path subsequent to establishing said first flow path and prior to establishing said third flow path during actuation of said piston member in said one direction to thereby effect said local reduction of said brake pipe fluid pressure.

2. A control valve device, as recited in claim 1, wherein said valve means comprises:
   (a) a slide valve seat fixed in said cavity and having a face portion; and
   (b) a slide valve member carried in a recess of said piston member for movement therewith, said recess being communicated with said second chamber and said slide valve member having a face portion engageable with said face portion of said slide valve seat.

3. A control valve device, as recited in claim 2, wherein said first flow path comprises:
   (a) a first passage in said slide valve seat having one end opening at said face portion thereof and the other end vented; and
   (b) a second passage in said slide valve member having one end opening at said face portion of said slide valve member and the other end opening into said recess, said slide valve member communicating said one end of said first and second passages in response to said actuation of said piston member in said one direction to establish said first flow path.

4. A control valve device, as recited in claim 3, wherein said third flow path comprises:
   (a) a third passage in said slide valve seat having one end opening at said face portion thereof and the other end opening into said first passage; and
   (b) a fourth passage in said slide valve member having one end opening at the face portion thereof and the other end opening into said recess, said slide valve member communicating said one end of said third and fourth passages in response to said actuation of said piston member in said one direction to establish said third flow path.

5. A control valve device, as recited in claim 4, wherein said first and second flow restrictions each comprise a drilled port in said second and fourth passages respectively, said first drilled port having a diameter less than the diameter of said second drilled port.

6. A control valve device, as recited in claim 5, wherein said second flow path comprises:
   (a) a fifth passage in said slide valve seat having one end opening at said face portion thereof and the other end connected to said brake pipe; and
   (b) a sixth passage in said slide valve member having one end opening at the face portion thereof and the other end opening into said second passage, said slide valve member communicating said one end of said fifth and sixth passages subsequent to said communication of said one end of said first and second passages during said actuation of said piston in said one direction to establish said second flow path via said fifth, sixth, second, and first passages.

7. A control valve device, as recited in claim 6, wherein said first flow restriction is located in said first flow path at a location upstream of said opening of said sixth passage into said second passage.

8. A control valve device, as recited in claim 7, further comprising a third flow restriction in said second flow path via which said local reduction of said brake pipe pressure is established.

9. A control valve device, as recited in claim 8, wherein said third flow restriction comprises a drilled port in said sixth passage having a diameter greater than the diameter of said first drilled port and less than the diameter of said second drilled port.

10. A control valve device, as recited in claim 9, further comprising a charging flow path via which said fluid pressure communication between said second chamber and said brake pipe is established in a release and charging position of said piston member.

11. A control valve device, as recited in claim 10, wherein said charging flow path comprises:
(a) a seventh passage in said slide valve seat having one end opening at said face portion thereof and the other end connected to said fifth passage; and
(b) an eighth passage in said slide valve member having one end opening at the face portion thereof and the other end opening into said recess, said slide valve member communicating said one end of said seventh and eighth passages to establish said charging flow path when said piston member is actuated in a direction opposite said one direction sufficiently to interrupt said first, second, and third flow paths, said slide valve member cutting off said one end of said seventh and eighth passages to interrupt said charging flow path upon initial actuation of said piston member in said one direction.

12. A control valve device, as recited in claim 11, further comprising a fourth flow restriction in said charging flow path via which said second chamber is charged with said brake pipe fluid under pressure.

13. A control valve device, as recited in claim 12, wherein said chargeing flow path is established by said valve means in a release and charging position of said piston member.

14. A control valve device, as recited in claim 13, wherein said second flow path is established by said valve means in an accelerated application position of said piston member.

15. A control valve device, as recited in claim 14, wherein said accelerated application position of said piston member is within a range of travel thereof.

16. A control valve device, as recited in claim 14, wherein said second and charging flow paths are interrupted by said valve means in a service lap position of said piston member.

17. A control valve device, as recited in claim 16, wherein said service lap position of said piston member lies within a range of travel of said piston member between said release and charging position and said accelerated application position thereof.

18. A control valve device, as recited in claim 17, wherein said second flow path is interrupted by said valve means when said piston member is actuated in said one direction from said accelerated application position to a cut-off position thereof.

19. A control valve device, as recited in claim 18, further comprising a fourth flow path to which fluid under pressure is connected from said second chamber.

20. A control valve device, as recited in claim 19, wherein said fourth flow path comprises an eighth passage in said slide valve seat having one end opening at said face portion thereof, the end of said slide valve member uncovering said one end of said eighth passage to communicate said recess therewith when said piston member is actuated in said one direction to an emergency position thereof.

21. A control valve device, as recited in claim 20, wherein said cut-off position of said piston member is within a range of travel thereof between said accelerated application position and said emergency position.

* * * * *